Patented June 20, 1933

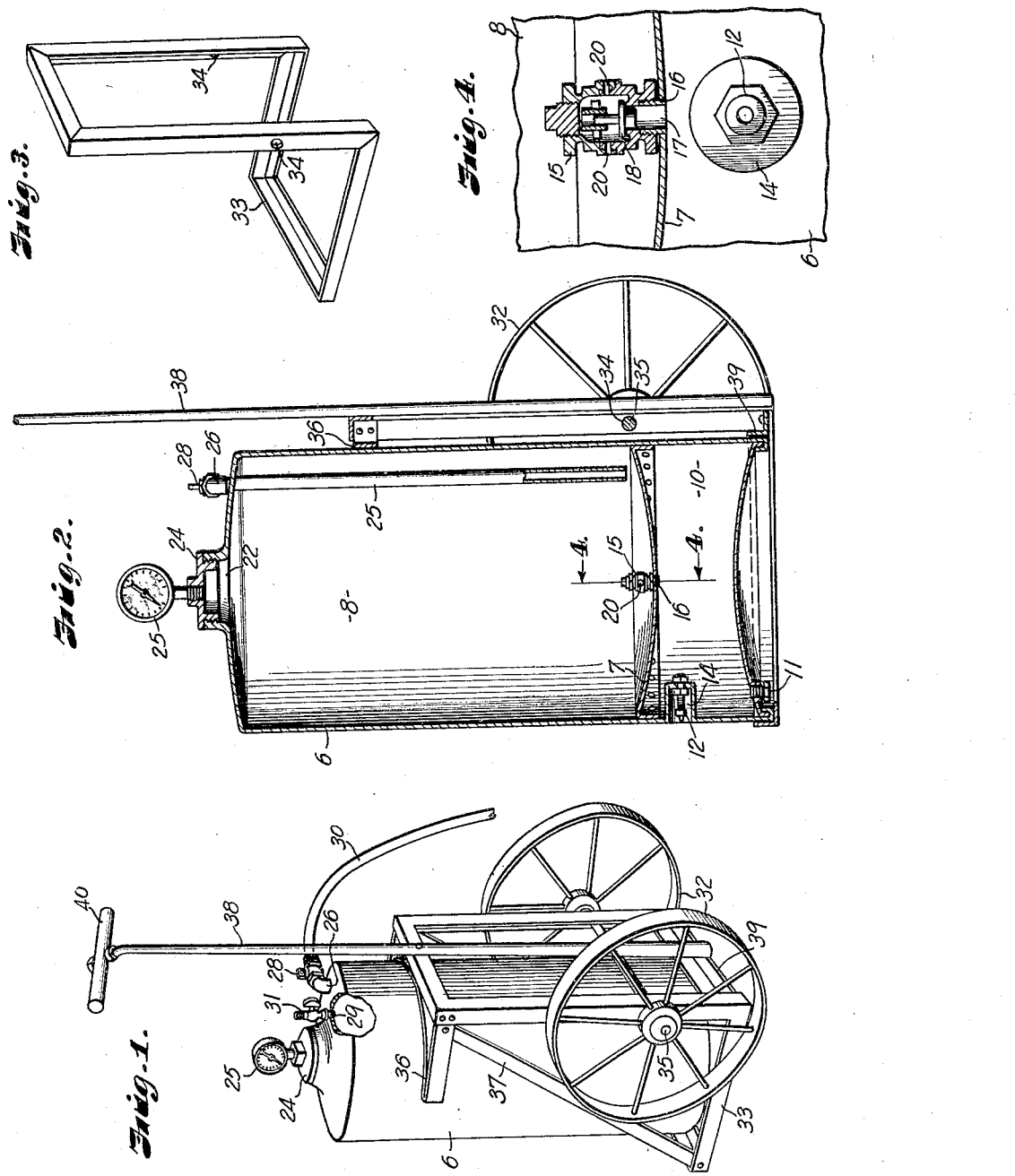

1,915,124

UNITED STATES PATENT OFFICE

WILLIAM ERNST, OF KANSAS CITY, KANSAS

FLUID PRESSURE SPRAYING APPARATUS

Application filed March 12, 1932. Serial No. 598,377.

The present invention relates to apparatus for spraying liquids, such as apparatus of the type used for the spraying of chemical solutions upon plants, trees and the like, and aims to provide a convenient portable outfit for this purpose, as well as a tank structure of a character adapted to utilize a compressed air supply for effecting a combined agitating and feeding action of the solution whereby the latter is discharged from the tank and delivered to the outlet leading to the spraying device as an air and liquid mixture suitable for spraying purposes.

Accordingly the invention comprises a tank structure of an appropriate size for accommodating a suitable quantity of the liquid solution, together with a compressed air compartment, and appropriate valves for providing communication between the air and liquid compartments of the tank, as well as for admitting the necessary air under pressure to the compressed air compartment. The improved arrangement also provides for the discharge of air jets laterally at the bottom of the liquid solution compartment, and also for liquid discharge means formed with an intake adjacent to the bottom of the liquid compartment, for the effective operation of the feeding of the solution to the spraying device.

The invention further comprises a suitable carrier structure for effectively supporting the tank structure and enabling it to be transported from place to place in an easy and convenient manner.

With the foregoing general object in view, the invention will now be described by reference to the accompanying drawing illustrating one suitable form of construction which I have devised for embodying the various features of improvement, after which those features and combinations deemed to be novel will be particularly set forth and claimed.

In the drawing—

Figure 1 is a perspective view showing an apparatus constructed in accordance with the present invention;

Figure 2 is a vertical sectional view, on a larger scale;

Figure 3 is a perspective detail of a portion of the carrier frame; and

Figure 4 is an enlarged sectional detail representing a section on the line 4—4 of Figure 2.

Referring now to the drawing in detail, the same illustrates the improved apparatus as comprising a tank structure 6 provided with a transverse partition 7, preferably dish-shaped dividing the interior of the tank into an upper liquid compartment 8 and a lower relatively smaller compressed air compartment 10 which may be provided with a bottom drain outlet plug 11 as shown in Figure 2. For the purpose of admitting a suitable supply of air under pressure to the compartment 10 a valve structure 12 is provided (similar to the common type used on inner tubes of automobile tires) which is mounted in a recess 14 in the side of the tank for appropriately shielding said valve structure from accidental damage. Centrally mounted on the partition 7 within the compartment 8 is a valve fitting 15 mounted on a pipe nipple 16 secured in a central opening 17 in said partition, the fitting being provided with an upwardly opening check valve 18 (see Figure 4) and also drilled with lateral orifices 20 for jetting the air in opposite lateral directions at the bottom of said compartment 8.

The top of the tank 6 is formed with a filling opening 22 which is threaded for a suitable cover member 24, the latter being also provided with a pressure gauge 25, as clearly illustrated in Figure 2.

Extending through the top of the tank is also an outlet pipe 25 which projects nearly to the bottom of the compartment 8 so that the intake end of said pipe is adjacent to the partition 7 as shown in Figure 2. To the outer end of the pipe 25 is secured an L 26 to which is attached a cutoff valve fitting 28 suitable for connection with a hose 30 intended to be equipped with any desired form of spraying device or attachment (not shown).

The top of the tank may also be provided with a suitable pipe nipple 29 for the attachment of a second cutoff valve fitting 31 suitable for attachment of a relatively smaller hose connection, such as may be employed for the supply of compressed air for paint spraying purposes, as an alternative use for which the tank apparatus is properly adapted.

For convenience as a supporting means and to enable the tank structure to be transported from place to place as desired, I provide a carrier comprising a framework on supporting wheels 32. The main portion of this framework is constructed of a single piece of angle iron 33 cut, bent and welded into the approximately L-shaped outline represented in Figure 3, the upright portions of which are provided with openings 34 for the axle 35 of the wheels 32. To the upper end of the frame 33 is secured a saddle member 36 of strap iron braced by side stays 37 of bar iron secured at their lower ends to the front corners of the frame 33, as shown in Figure 1. An operating handle 38 of suitable length is secured to the upper transverse portion of the frame 33 and also to a cross bar 39 connecting the lower rear corners of said frame 32, the upper free end of the handle carrying a suitable handle bar 40.

In the use of the apparatus, it will be understood that the upper compartment 8 may be filled with the desired quantity of liquid solution, when used for plant-spraying purposes, by temporary removal of the cover member 24, the check valve 18 of course remaining closed for retaining the solution within the upper compartment 8. A supply of air under pressure is then admitted to the lower compartment 10, as by means of either a hand air pump or other source of air under pressure applied to the valve fitting 12. The valve structure 15 affords the necessary communication between the compartments 8 and 10, and as the liquid solution is used, by opening of the valve 28 and operation of the spraying device, the admission of air into the compartment 8 takes place by lateral jets discharged from the orifices 20 directed laterally within the bottom of the compartment 8, and as the air is thus obliged to circulate both laterally and upwardly through the liquid, this serves to maintain a vigorous agitation of the solution, such as is desirable for keeping the ingredients of the solution in even uniform suspension. The liquid is of course expelled by the air pressure, and the discharge arrangement is such as to take the solution from a point immediately adjacent to the partition 7 or the bottom of the compartment 8, thus enabling practically the entire contents of said compartment to be discharged under the action of air pressure.

It will therefore be seen that a practical and efficient arrangement and construction have been devised for carrying out the desired objects of the invention, and that the supporting structure is of a strong rigid character, and enables the apparatus to be conveniently wheeled from point to point, as required, and the provision of the alternative valve structure 31 further enables the tank structure to be used for painting operations, or the like, as well as for the usual liquid spraying function, for which the apparatus is more especially adapted.

While I have shown and described what I now regard as the preferred and most efficient form of construction for the embodiment of the improvements, I desire to reserve the right to make whatever changes or modifications may fairly fall within the scope of the appended claims.

Having thus described my invention, what I claim to be new and desire to secure by Letters-Patent is:

1. A tank structure for liquid spraying apparatus comprising a tank divided into an upper liquid solution compartment and a lower air pressure compartment, a valve for admitting air under pressure to the lower compartment, a check valve for admitting compressed air from the lower compartment to the upper compartment and provided with lateral jet orifices adjacent to the bottom of said upper compartment, and a spraying outlet or discharge pipe leading from said upper compartment and having its inlet end positioned adjacent to the bottom of said upper compartment.

2. A tank structure for liquid spraying apparatus comprising a tank, a dish-shaped partition dividing the tank into a lower air pressure compartment and an upper liquid solution compartment having a top filling opening, a removable cover member for said opening, a valve for admitting air under pressure to the lower compartment, a check valve mounted centrally of said partition for providing communication between said compartments and having a plurality of radial jet orifices for spraying laterally over the concave face of said partition, and a spraying outlet or discharge pipe communicating with said upper compartment adjacent to the bottom thereof.

In witness whereof I hereunto affix my signature.

WILLIAM ERNST.